(12) United States Patent
Lamboglia et al.

(10) Patent No.: US 11,230,143 B2
(45) Date of Patent: Jan. 25, 2022

(54) HUB-BEARING ASSEMBLY FOR VEHICLES

(71) Applicant: Aktiebolaget SKF, Gothenburg (SE)

(72) Inventors: Francesco Lamboglia, Pinerolo (IT); Daniele Brogna, Venaria Reale (IT); Fausto Morello, Sommariva del Bosco (IT); Fulvio Nicastri, Garzigliana (IT)

(*) Notice: Subject to any disclaimer, the term of this patent is extended or adjusted under 35 U.S.C. 154(b) by 471 days.

(21) Appl. No.: 16/020,388

(22) Filed: Jun. 27, 2018

(65) Prior Publication Data
US 2019/0023068 A1    Jan. 24, 2019

(30) Foreign Application Priority Data
Jul. 19, 2017  (IT) .................. 102017000081652

(51) Int. Cl.
*B60B 27/02* (2006.01)
*B60B 27/00* (2006.01)
(Continued)

(52) U.S. Cl.
CPC ...... *B60B 27/0094* (2013.01); *B60B 27/0084* (2013.01); *B60B 27/02* (2013.01);
(Continued)

(58) Field of Classification Search
CPC ............ B60B 27/0094; B60B 27/0084; B60B 27/0005; B60B 27/001; B60B 27/06; B60B 27/02; B60B 2900/212; B60B 2900/112; B60B 2900/113; B60B 2900/325; B60B 2310/213; B60B 2380/12; B60B 2380/73;
(Continued)

(56) References Cited

U.S. PATENT DOCUMENTS

2002/0051597 A1  5/2002  Sera et al.
2007/0116397 A1  5/2007  Pauskar et al.
(Continued)

FOREIGN PATENT DOCUMENTS

CN    101574896    11/2009
CN    101755139    6/2010
(Continued)

OTHER PUBLICATIONS

First Office Action of corresponding Chinese Application No. 201810776216 dated Feb. 22, 2021.

*Primary Examiner* — Scott A Browne
(74) *Attorney, Agent, or Firm* — Reed Smith LLP

(57) ABSTRACT

A hub-bearing assembly for rotatably mounting a motor vehicle wheel on a suspension strut having a wheel hub to support the wheel of the vehicle and having an axial shoulder, a bearing unit providing a radially outer stationary ring constrained to the strut; a first radially inner rotating ring mounted on the hub, and a second radially inner rotating ring defined by the hub, two rows of rolling bodies interposed between the radially outer stationary ring and the two radially inner rotating rings inside a first raceway and a second raceway formed, respectively, the first inner ring providing a substantially non-deformable Hertzian portion,
(Continued)

on which is formed the second raceway, and an accumulation portion integral with the Hertzian portion and interposed between the Hertzian portion and the axial shoulder for accumulating elastic energy during cold deformation to obtain the rolled edge.

5 Claims, 1 Drawing Sheet

(51) Int. Cl.
*F16C 33/60* (2006.01)
*F16C 33/58* (2006.01)
*F16C 43/04* (2006.01)
*F16C 19/18* (2006.01)
*F16C 25/08* (2006.01)

(52) U.S. Cl.
CPC .......... *F16C 19/186* (2013.01); *F16C 33/583* (2013.01); *F16C 33/60* (2013.01); *F16C 43/04* (2013.01); *B60B 27/0005* (2013.01); *B60B 2310/208* (2013.01); *B60B 2310/213* (2013.01); *B60B 2380/12* (2013.01); *B60B 2380/73* (2013.01); *B60B 2900/112* (2013.01); *B60B 2900/113* (2013.01); *B60B 2900/212* (2013.01); *B60B 2900/325* (2013.01); *F16C 25/083* (2013.01); *F16C 2326/02* (2013.01)

(58) Field of Classification Search
CPC ........ F16C 33/60; F16C 33/583; F16C 43/04; F16C 19/186
See application file for complete search history.

(56) References Cited

U.S. PATENT DOCUMENTS

| 2013/0108201 A1* | 5/2013 | Takimoto | B60B 27/0094 384/548 |
|---|---|---|---|
| 2017/0210165 A1* | 7/2017 | Kawamura | F16C 35/06 |
| 2019/0070900 A1* | 3/2019 | Konishi | G01P 1/02 |

FOREIGN PATENT DOCUMENTS

| CN | 204099409 | | 1/2015 |
| DE | 102014203206 | A1 | 8/2015 |
| JP | 2009156450 | | 7/2009 |
| JP | 2009156450 | A | 7/2009 |
| WO | 2015124125 | A1 | 8/2015 |

\* cited by examiner

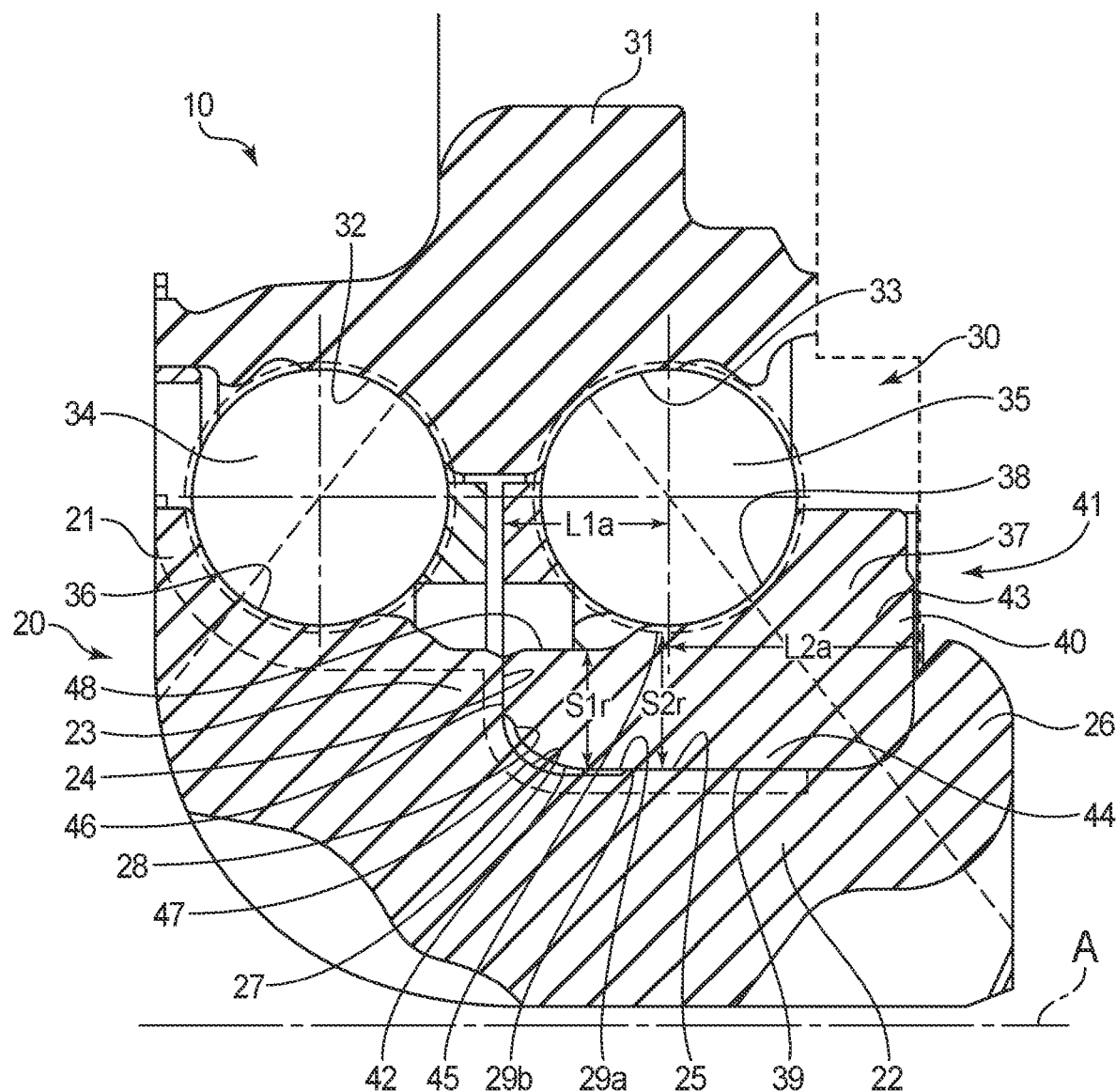

HUB-BEARING ASSEMBLY FOR VEHICLES

CROSS-REFERENCE

This application claims priority to Italian patent application no. 102017000081652 filed on Jul. 19, 2017, the contents of which are fully incorporated herein by reference.

TECHNOLOGICAL FIELD

The present invention relates to a hub-bearing assembly for vehicles.

BACKGROUND

Known hub-bearing assemblies enable a wheel of a motor vehicle to be rotatably mounted on a suspension strut or upright of the vehicle and include a wheel hub and a bearing unit, where the wheel hub has a flange that is designed to bear, when in use, the wheel of the vehicle and performs the function of a radially inner rotating ring of the bearing unit, and this latter includes a stationary outer ring that is designed to be constrained, when in use, to the strut or upright, a respective radially inner rotating ring mounted on the wheel hub, and two rows of rolling bodies interposed between the radially outer stationary ring and the two radially inner rotating rings.

The radially inner ring of the bearing unit is made separately from the wheel hub to enable assembly of the hub-bearing assembly and is mounted on the wheel hub axially behind an axial shoulder of the wheel hub such as to be locked there, axially on the opposite side of the shoulder, by a rolled edge formed directly behind the radially inner ring by cold deformation, or by orbital roll forming in a radially outward direction of an axially free end of the wheel hub.

Although the axial locking of the radially inner ring of the bearing unit by orbital roll forming on one hand enables very rapid and efficient axial locking with obvious benefits both in terms of cost and production times, it entails some technical problems that could, in extreme cases, have an impact both on the performance and the reliability of the known hub-bearing assemblies described above. The orbital roll forming of the radially inner ring on the wheel hub has always been considered to result in the permanent preloading of the bearing unit or, in addition to the aforementioned benefits, it has always made it possible to eliminate one of the most common causes of breakage of the bearing units, namely the loss of the preloading. However, when in use, the radially inner ring is subjected to "hammering" caused by the bending of the flange that causes separation of some circular portions of the radially inner ring from the shoulder, and a simultaneous axial compression of other circular portions of the radially inner ring on the shoulder. In the long term, the more acute this phenomenon becomes, the greater the risk of the hub-bearing assembly breaking.

SUMMARY

The present invention is intended to provide a hub-bearing assembly for vehicles in which certain adjustments are applied thereto to obviate the drawbacks described above.

The present invention provides a hub-bearing assembly for vehicles having the characteristics set out in the attached claims.

BRIEF DESCRIPTION OF THE DRAWINGS

The invention is described here with reference to the attached FIGURE showing details of an axial-symmetrical cross section of a wheel hub assembly according to a preferred embodiment of the invention, with some parts removed for the sake of clarity.

DETAILED DESCRIPTION

In the attached FIGURE, reference sign 10 indicates the whole of the hub-bearing assembly for vehicles including a central axis of rotation A, in which a wheel (not shown) of a motor vehicle is intended to be rotatably mounted about the axis A.

Throughout the present description and the claims, terms and expressions used to indicate positions and directions; such as "radial", "axial" and "transverse"; shall be understood to refer to the central axis of rotation A. On the other hand, expressions such as "axially internal" (or "inboard") and "axially external" (or "outboard") refer to the assembled condition, and in this case preferably refer to a wheel side and to a side opposite the wheel side respectively.

The assembly 10 includes a rotary wheel hub 20 of a known type and a bearing unit 30, which in turn comprises a stationary radially outer ring 31 that is designed, when in use, to be constrained in a known manner to a vehicle suspension strut or upright provided internally with two outer raceways 32 and 33 designed to receive a first row 34 and a second row 35 of rolling bodies or elements, in this case ball bearings. For the sake of simplicity in the FIGURE, reference signs 34 and 35 shall refer both to the individual ball bearings and to the row of ball bearings, and in particular reference sign 34 shall refer to the axially outer individual ball bearing or row of ball bearings, and reference sign 35 shall refer to the axially inner individual ball bearing or row of ball bearings. Again for the sake of simplicity, the term "ball bearing" shall be used often by way of example in the present description and in the attached drawing instead of the more generic term "rolling member", and the same reference signs shall be used. It is understood that any type of rolling member can be used instead of ball bearings, such as rollers, conical rollers and needle rollers.

The wheel hub 30 acts as a radially inner ring of the bearing unit 30 and comprises:
- a flange (not shown) that is designed to support, when in use, a wheel of the vehicle in a known manner,
- a first central tubular portion 21 connected to the flange (known and not shown) and having a first axially external raceway 36 for the first row 34 of rolling elements, and
- a second central tubular portion 22 that extends axially inwards from the first central tubular portion 21, that has an external diameter that is smaller than the external diameter of the first central tubular portion 21 and that defines with the latter a shoulder 23 that is delimited axially on the inside by an annular surface 24 transverse to the axis A.

The second central tubular portion 22 is delimited radially on the outside by a cylindrical assembly surface 25 or assembly seat on which is mounted an radially inner ring 37 that is part of the bearing unit 30 and has a second axially internal raceway 38 for the second row 35 of rolling elements. The radially inner ring 37 and the second raceway 38 are formed separately from the wheel hub 20 and from the first raceway 36 to enable the second row 35 of rolling elements to be inserted into the bearing unit 30 after the outer ring 31 has been mounted on the first row 34 of the rolling elements. The radially inner ring 37 is radially delimited on the insides by a cylindrical surface 39 mounted on the second by a cylindrical assembly surface 25, and is axially delimited on the inside by an annular surface 40 transverse to the axis A and behind an axially internal end of the central tubular portion 22 is cold deformed by orbital roll forming in a radially outward direction to obtain a rolled edge 26 that is deformed plastically behind the radially inner ring 37, which axially locks the radially inner ring 37 against the shoulder 24.

According to the present invention, in order to disassociate the performance of the hub-bearing assembly 10, in terms of reliability and service life, from the phenomenon of hammering, i.e. the effect that the bending of the flange (not shown) has on the rest of the structure of the bearing unit, in particular the effect caused in relation to the contact between the shoulder 23 and the radially inner ring 37, this latter has a supporting Hertzian portion 41 that contains the second raceway 38, and an accumulation portion 42, which is rigidly connected to the Hertzian portion 41 and extends axially from the Hertzian portion 41 from the second raceway 38.

In particular, the second raceway 38 defines, on the Hertzian portion 41:
  a radial shoulder 43 arranged substantially laterally and axially in relation to the second row 35 of rolling elements, having a substantially rectangular section with a small side arranged along the cylindrical surface 39, and
  a supporting portion 44 that is arranged axially between the shoulder 43 and the accumulation portion 42 and that has a substantially rectangular trapezoid section, in which the inclined side is replaced entirely by the profile of the second raceway 38, the large side coincides with a large side of the rectangle defining the shoulder 43, and the oblique side perpendicular to the large base is axially aligned with the small side of the rectangle defining the shoulder 43 and is arranged along the cylindrical surface 39.

The second raceway 38 has, on the supporting portion 44, a throat 45 that intercepts a theoretical annular boundary surface between the Hertzian portion 41 and the accumulation portion 42.

The accumulation portion 42 is limited axially to the outside of a respective annular surface 46 arranged behind the annular surface 24, is partially limited radially on the inside by the cylindrical surface 39 connected to the annular surface 46 by a toroidal surface 47, and finally has an outer cylindrical surface 48 that is radially recessed in relation to the throat 45, i.e. the accumulation portion 42 has a radial thickness $S1r$ that is definitely less than a radial thickness $S2r$ of the supporting portion 44 measured at the throat 45. Furthermore, the accumulation portion 42 extends axially from the supporting portion 44 along an axial length $L1a$ that is substantially and preferably less than an axial length $L2a$ of the Hertzian portion 41.

As a whole, the dimensions of the accumulation portion 42 are smaller than the total dimensions of the Hertzian portion 41 and most of all, in accordance with the reduced thickness $S1r$, the structural behaviour of the accumulation portion is completely different from the structural behaviour of the Hertzian portion 41. Indeed, while the latter remains practically undeformed during the cold deformation by orbital roll forming of the rolled edge 26 behind the radially inner ring 37, the accumulation portion 42 tends, as a result of the reduced thickness $S1r$ thereof, to be compressed axially and to deform elastically, or tends to accumulate elastic energy that is returned, when in use, as axial lengthening, if, under the effect of the bending of the flange (not shown), the radially inner ring 37 tends to move away from the shoulder 23.

In other words, by designing, contrary to conventional wisdom regarding the mechanical design of hub-bearing assemblies for vehicles, an elastic accumulation portion 42 that is undoubtedly more yielding than the Hertzian portion 41, or an accumulation portion 42 with a radial thickness $Sr1$ that is less than the radial thickness $Sr2$ of the Hertzian portion 41, the accumulation portion 42 tends to undergo the effect of the axial thrust exerted by the rolled edge 26 during the cold deformation by orbital roll forming, substantially all of the axial thrust being transmitted through the Hertzian portion 41, the Hertzian portion conversely remaining practically intact.

The overall dimensions of the hub-bearing assembly 10 and the composition of the metal forming the radially inner ring 37 determine, during the design phase, the dimensioning both of the thickness $S1r$, or how much the cylindrical surface 48 should be unloaded in relation to the throat 45, guaranteeing, when in use, the absence of the aforementioned phenomenon of hammering, or guaranteeing a significant improvement both in reliability and of the service life of the hub-bearing assembly 10.

Preferably, in combination with the reduction of the radial thickness $S1r$ of the accumulation portion 42 of the radially inner ring 37, and again with a view to improving both the reliability and the service life of the hub-bearing assembly 10, the latter includes an annular groove 27 formed in the mounting surface 25 in the passage between the assembly seat 25 and the shoulder 23, and a fillet 28 between the annular groove 27 and the surface 24. The greater the dimensions of a radius of curvature of the fillet 28, i.e. the greater the radial depth of the annular groove 27 formed in the mounting surface 25, the better the distribution of the stresses in the passage.

Also in order to better distribute the stresses not only in the passage but also in the opposite portion of the annular groove 27, this annular groove is connected to the mounting surface 25 with two further fillets 29a and 29b that have opposing concavities, the fillet 29a having a concavity oriented radially outwards like a concavity of the fillet 28 and a radius of curvature having dimensions substantially similar to the dimensions of a radius of curvature of the fillet 28, while the fillet 29b has a concavity that is oriented radially inwards and a radius of curvature having dimensions that are substantially twice the dimensions of a radius of curvature of the fillet 29a.

Surprisingly, the combination of these adjustments, i.e. the provision of the annular 30 groove 27 and the reduction of the thickness $S1r$ provides a hub-bearing assembly 10 with levels of reliability and a service life that were previously entirely unimaginable. Furthermore, the solution adopted and described above is easy to implement, and is economically beneficial inasmuch as no significant modifications are required to the production cycle of existing known hub-bearing assemblies, it being sufficient to apply some minor changes to the cycle to make both the radially inner ring 37 of lesser thickness $S1r$, including lesser than the thickness of existing radially inner rings, and the annular groove 27.

What is claimed is:

1. A hub-bearing assembly for rotatably mounting a wheel of a motor vehicle on a suspension strut of the same vehicle, the hub bearing assembly comprising:
- a wheel hub to support the wheel of the vehicle and provided with an axial shoulder;
- a bearing unit having a radially stationary outer ring configured to be constrained to the strut; a first radially inner rotating ring mounted on the wheel hub, separately from the wheel hub, and just before the axial shoulder to be locked, axially on the opposite side of the axial shoulder, by means of a rolled edge is provided directly behind the first radially inner rotating ring by cold deformation; and a second radially inner rotating ring defined by the wheel hub;
- two rows of rolling bodies radially interposed between the stationary outer ring and the two rotating radially inner rings inside a first rolling raceway and a second rolling raceway formed, respectively, in the first and in the second radially inner rotating ring, and
- the first radially inner rotating ring comprises a supporting Hertzian portion formed by a second raceway and an accumulation portion extending axially from the second raceway, and
- an annular groove being formed in a mounting surface in a passage between an assembly seat, a shoulder, and a fillet, such that radial depth of the annular groove corresponding to radius of curvature of the fillet, wherein,
- the accumulation portion includes a reduced thickness and dimensions smaller than dimensions of the Hertzian portion,
- the Hertzian portion being substantially non-deformable and the accumulation portion being deformable elastically due to the reduced thickness such that the accumulation portion being able to accumulate elastic energy during the cold deformation for obtaining the rolled edge.

2. The hub-bearing assembly according to claim 1, wherein the accumulation portion includes a thickness of radial dimensions smaller than the size of a radial thickness of a supporting portion measured in correspondence to a bottom throat of the second rolling raceway.

3. The hub-bearing assembly according to claim 2, wherein the fillet is formed between the groove and the shoulder to improve the distribution of the stresses in the hub-bearing unit itself.

4. The hub-bearing assembly according to claim 1, wherein the accumulation portion is configured to compress axially and deform elastically due to the reduced thickness.

5. The hub-bearing assembly according to claim 1, wherein the accumulation portion is configured to release the elastic energy upon axial lengthening of the accumulation portion.

* * * * *